(No Model.)
W. S. LOOMIS & S. O. PIKE.
HAY RAKE AND LOADER COMBINED.
No. 577,166.          Patented Feb. 16, 1897.
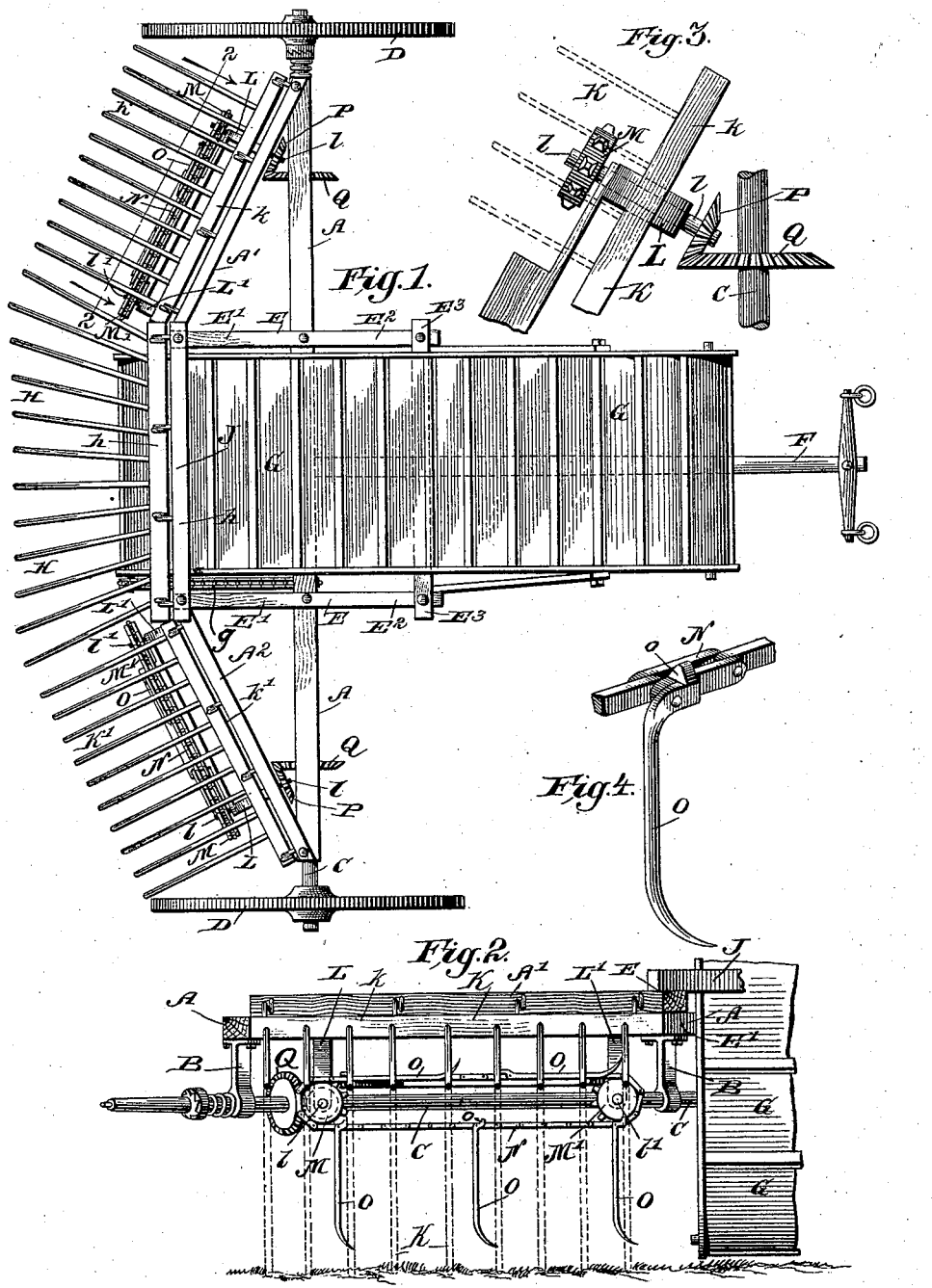
WITNESSES:
H. T. Dieterich
J. Edw. Luckett
INVENTORS
W. S. Loomis
S. O. Pike
BY O'Meara & Co.
ATTORNEYS

UNITED STATES PATENT OFFICE.

WILLIAM S. LOOMIS AND SILAS O. PIKE, OF SYCAMORE, ILLINOIS.

HAY RAKE AND LOADER COMBINED.

SPECIFICATION forming part of Letters Patent No. 577,166, dated February 16, 1897.

Application filed November 4, 1895. Serial No. 567,914. (No model.)

*To all whom it may concern:*

Be it known that we, WILLIAM S. LOOMIS and SILAS OTHELLO PIKE, residing at Sycamore, in the county of De Kalb and State of Illinois, have invented a new and Improved Hay Rake and Loader Combined, of which the following is a specification.

Our invention relates to improvements in that class of rakes or gatherers adapted to be used in connection with suitable elevating devices which lift the gathered hay onto the carrier; and our invention primarily has for its object to provide a simple and economical construction which can be easily manipulated and which will effectively serve for its intended purposes.

Our invention also has for its object to provide a rake of this kind having supplemental gathering means which will serve to move the hay as it is gathered by the rake toward the center of the machine in front of a supplemental or carrier-feeding rake portion.

With other objects in view, which will hereinafter appear, the invention consists in such peculiar combination and novel arrangement of parts, such as will be first described in detail and then be specifically pointed out in the appended claims, reference being had to the accompanying drawings, in which—

Figure 1 is a top plan view. Fig. 2 is a sectional view on the line 2 2 of Fig. 1, looking forward. Fig. 3 is a detail view of the mechanism for operating the endless chain of rake-fingers. Fig. 4 is a detail view of one of such fingers and a portion of the chain.

In its practical construction our invention comprises a main supporting-frame, consisting of a transverse supporting-bar A, having a number of downwardly-extending brackets B B, in which is held to revolve a shaft C, on the ends of which are mounted the drive-shaft or supporting-wheels D D, the hubs of which have a ratchet connection with the shaft C, of the usual construction, whereby the wheels are held to turn freely backward without rotating the shaft.

E E indicate a pair of longitudinal beams which are held on the bar A and extend rearwardly, as at E' E', and forwardly, as at $E^2$ $E^2$, the forward ends of the extensions $E^2$ being joined by a transverse beam $E^3$, to which and also the bar A is made fast the draft-tongue F, as clearly shown in Fig. 2. The extensions $E^2$ $E^2$ also form the support for the carrier-elevator device G, which may be of any approved construction and is operated through the medium of the drive-chain $g$, driven from the sprocket and the shaft C.

The rear end of the elevator G is so arranged as to extend down close to a central gathering-rake H, the head $h$ of which is hinged to a cross-bar J on the rear end of the frame members E' E'. At each side of the central rake H is disposed a rake K and K', which are set at an angle of about twenty-two degrees to the bar A and have their heads $k'$ $k'$ hinged to the bars A' $A^2$, which connect at one end of the bar A and at the other the extensions E' E'.

The several rakes H, K, and K' may be of any approved construction and have the usual spring-teeth, and also have their heads $h$ $k$ $k'$ connected to the bars A', $A^2$, and J by a spring-hinge connection.

So far as described it will be readily seen that the side rakes also serve to gather the hay in a V shape toward the central rake.

To carry the collected hay positively toward the central rake and deposit it practically in front of the same and the receiving end of the elevator or carrier, we provide a supplemental gathering means for each side rake, the construction of which is best illustrated in Figs. 3 and 4, by reference to which it will be seen that adjacent the wheel each of the beams A and A', to which the rake-heads $k$ and $k'$ are hinged, has a pendent bracket L and at the other end a similar pendent bracket L'. In the said brackets are journaled short stub-shafts $l$ and $l'$, respectively, which carry on their outer ends sprocket-wheels M M', over which passes a sprocket-chain N, having a series of long lugs or fingers O, which will hang pendent and rigid as they travel toward the central rake and serve to carry the gathered hay toward the said central rake. These lugs or fingers are provided with stops $o$, which bear on the top of chain and hold the fingers rigid while moving toward the elevation, but when making the backward movement said fingers drop down and travel along a shelf secured to the brackets L and L', as clearly shown in Figs. 2 and 3. The stub-shafts $l$ and $l'$ have each a bevel-gear P, which meshes with bevel-gears Q, fixedly held on the shaft C.

From the foregoing description, taken in connection with the accompanying drawings, it is thought the advantages and operation of our invention will be readily understood. It will be observed that as the machine travels along the field the hay will be drawn toward the central rake by the side rakes and moved transversely by the endless gathering device.

Having thus described our invention, what we claim as new, and desire to secure by Letters Patent, is—

1. In a hay-rake the combination with the frame and drive-shaft, of the elevation, the rear-rake section, the side-rake section arranged at an angle to the rear-rake section, the endless chain of rake-fingers, each finger having a stop $o$, to engage the link of the chain and hold it rigid while moving toward the rear-rake section and means for operatively connecting the said chain with the drive-shaft substantially as shown and described.

2. In a hay-rake, the combination with the frame, and drive-shaft, of an elevator, the rear-rake section, the side-rake section arranged at an angle to the rear-rake section, the endless chain of rake-fingers, each finger having a suitable stop to engage the link of chain, and the shelf upon which said fingers rest when on the back flight and means for operatively connecting the said chain with the drive-shaft substantially as shown and described.

WILLIAM S. LOOMIS.
SILAS O. PIKE.

Witnesses:
EDWARD BOYNTON,
H. T. SMITH.